United States Patent
Zeng (10) Patent No.: US 10,482,331 B2
(45) Date of Patent: Nov. 19, 2019

(54) STIXEL ESTIMATION METHODS AND SYSTEMS

(71) Applicant: GM GLOBAL TECHNOLOGY OPERATIONS LLC, Detroit, MI (US)

(72) Inventor: Shuqing Zeng, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 460 days.

(21) Appl. No.: 15/353,359

(22) Filed: Nov. 16, 2016

(65) Prior Publication Data

US 2017/0147888 A1    May 25, 2017

Related U.S. Application Data

(60) Provisional application No. 62/258,303, filed on Nov. 20, 2015.

(51) Int. Cl.
*G06K 9/00* (2006.01)
*G01S 13/86* (2006.01)
*G01S 13/93* (2006.01)

(52) U.S. Cl.
CPC ........ *G06K 9/00791* (2013.01); *G01S 13/867* (2013.01); *G01S 13/931* (2013.01); *G06T 2207/10004* (2013.01); *G06T 2207/10044* (2013.01); *G06T 2207/20081* (2013.01); *G06T 2207/20104* (2013.01); *G06T 2207/30261* (2013.01)

(58) Field of Classification Search
CPC .......... G06K 9/00791; G06K 9/00805; G06K 9/6273; G06T 7/77; G06T 2207/1004; G06T 2207/10024; G06T 2207/10028; G06T 2207/10044; G06T 2207/20081; G06T 2207/20084; G06T 2207/20104; G06T 2207/30261; G01S 13/867; G01S 13/931
USPC .......................................................... 342/52
See application file for complete search history.

(56) References Cited

U.S. PATENT DOCUMENTS

| | | | | |
|---|---|---|---|---|
| 5,542,006 A * | 7/1996 | Shustorovich | ........... | G06K 9/32 382/156 |
| 5,912,986 A * | 6/1999 | Shustorovich | ........... | G06K 9/32 382/156 |
| 6,028,956 A * | 2/2000 | Shustorovich | ....... | G06K 9/3233 382/156 |
| 6,414,712 B1 * | 7/2002 | Wanielik | ................. | G01C 21/28 348/118 |
| 6,492,935 B1 * | 12/2002 | Higuchi | ................ | G01S 13/931 342/54 |
| 7,460,951 B2 * | 12/2008 | Altan | ..................... | G01S 13/726 340/903 |
| 8,548,229 B2 * | 10/2013 | Badino | ............... | G06K 9/00805 382/106 |

(Continued)

*Primary Examiner* — Peter M Bythrow
*Assistant Examiner* — Nuzhat Pervin
(74) *Attorney, Agent, or Firm* — Lorenz & Kopf, LLP (57) ABSTRACT

Methods and systems are provided for detecting an object. In one embodiment, a method includes: receiving, by a processor, image data from an image sensor; receiving, by a processor, radar data from a radar system; processing, by the processor, the image data from the image sensor and the radar data from the radar system using a deep learning method; and detecting, by the processor, an object based on the processing.

13 Claims, 5 Drawing Sheets

(56) References Cited

U.S. PATENT DOCUMENTS

| | | | | |
|---|---|---|---|---|
| 9,201,421 | B1* | 12/2015 | Fairfield | B60W 40/04 |
| 2009/0318815 | A1* | 12/2009 | Barnes | A61B 5/742 |
| | | | | 600/473 |
| 2009/0326383 | A1* | 12/2009 | Barnes | A61B 5/0059 |
| | | | | 600/476 |
| 2010/0191391 | A1* | 7/2010 | Zeng | G01S 13/723 |
| | | | | 701/1 |
| 2011/0098056 | A1* | 4/2011 | Rhoads | G01C 21/20 |
| | | | | 455/456.1 |
| 2011/0279303 | A1* | 11/2011 | Smith, Jr. | G01S 13/89 |
| | | | | 342/52 |
| 2012/0287031 | A1* | 11/2012 | Valko | G09G 5/00 |
| | | | | 345/156 |
| 2013/0273968 | A1* | 10/2013 | Rhoads | G06K 9/6253 |
| | | | | 455/556.1 |
| 2014/0184800 | A1* | 7/2014 | Hirai | G01N 21/958 |
| | | | | 348/148 |
| 2015/0086079 | A1* | 3/2015 | Murao | G06K 9/00791 |
| | | | | 382/104 |
| 2015/0153444 | A1* | 6/2015 | Nichols | G01S 13/726 |
| | | | | 342/385 |
| 2015/0166072 | A1* | 6/2015 | Powers | B60W 40/06 |
| | | | | 701/1 |
| 2015/0261571 | A1* | 9/2015 | Arun | G06F 9/4881 |
| | | | | 345/522 |
| 2015/0324659 | A1* | 11/2015 | Liu | G06T 7/593 |
| | | | | 382/197 |
| 2016/0096270 | A1* | 4/2016 | Ibarz Gabardos | B25J 9/163 |
| | | | | 700/253 |
| 2016/0167226 | A1* | 6/2016 | Schnittman | B25J 5/00 |
| | | | | 382/153 |

\* cited by examiner

STIXEL ESTIMATION METHODS AND SYSTEMS

TECHNICAL FIELD

The technical field generally relates to object detection systems and methods, and more particularly relates to object detection systems and methods that estimate one or more stixels in a scene and detect objects based on the estimated stixels.

BACKGROUND

Various systems process data to detect objects in proximity to the system. For example, some vehicle systems detect objects in proximity to the vehicle and use the information about the object to alert the driver to the object and/or to control the vehicle. The vehicle systems detect the object based on sensors placed about the vehicle. For example, multiple cameras are placed in the rear, the side, and/or the front of the vehicle in order to detect objects. Images from the multiple cameras are used to detect the object based on stereo vision. Implementing multiple cameras in a vehicle or any system increases an overall cost.

Accordingly, it is desirable to provide methods and systems that detect objects in an image based on a single camera. Furthermore, other desirable features and characteristics of the present invention will become apparent from the subsequent detailed description and the appended claims, taken in conjunction with the accompanying drawings and the foregoing technical field and background.

SUMMARY

Methods and systems are provided for detecting an object. In one embodiment, a method includes: receiving, by a processor, image data from an image sensor; receiving, by a processor, radar data from a radar system; processing, by the processor, the image data from the image sensor and the radar data from the radar system using a deep learning method; and detecting, by the processor, an object based on the processing.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
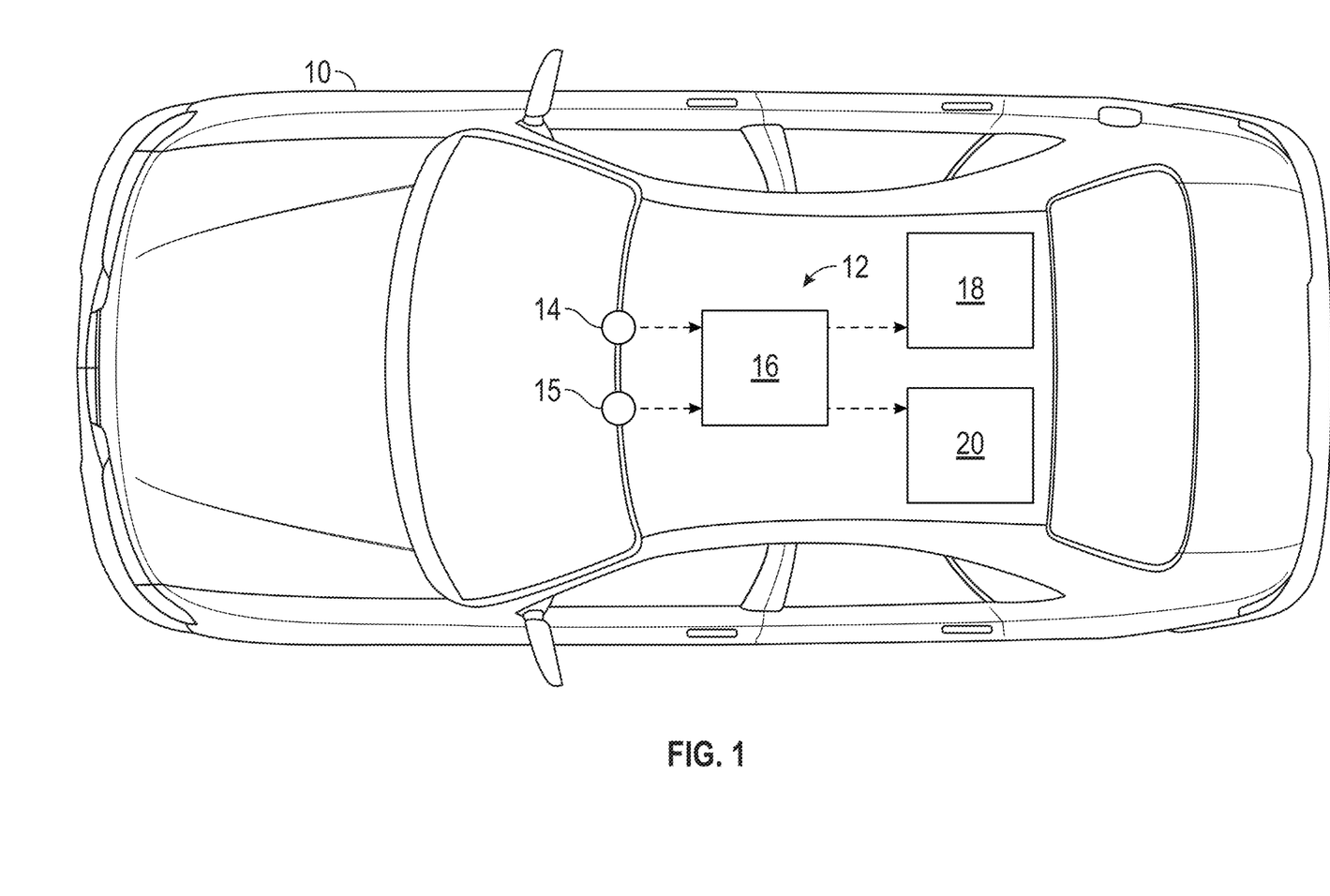
FIG. 1 is illustration of a vehicle that includes an object detection system in accordance with various embodiments.

Referring now to FIG. 1, a vehicle 10 is shown to include an object detection system 12 in accordance with various embodiments. The object detection system 12 estimates a stixel and free-space representation of an external environment using input from two or more different sensors such as, but not limited to, from one monocular camera and one radar system. As can be appreciated, the object detection system 12 shown and described can be implemented in various systems including non-mobile platforms or mobile platforms such as, but not limited to, automobiles, trucks, buses, motorcycles, trains, marine vessels, aircraft, rotorcraft, robots, robotic platforms and the like. For exemplary purposes, the disclosure will be discussed in the context of the object detection system 12 being implemented in the vehicle 10. Although the figures shown herein depict an example with certain arrangements of elements, additional intervening elements, devices, features, or components may be present in an actual embodiments. It should also be understood that FIG. 1 is merely illustrative and may not be drawn to scale.

In various embodiments, the object detection system 12 includes an image sensor 14 (e.g., a camera or other image sensing device) and a radar system 15 that are associated with an object detection module 16. The image sensor 14 can be located anywhere inside or outside of the vehicle 10, including, but not limited to, a front side of the vehicle 10, a left side of the vehicle 10, a right side of the vehicle 10, and a back side of the vehicle 10. As can be appreciated, multiple image sensors 14 can be implemented on the vehicle 10, one for each of or a combination of the front side of the vehicle 10, the left side of the vehicle 10, the right side of the vehicle 10, and the back side of the vehicle 10. For exemplary purposes, the disclosure will be discussed in the context of the vehicle 10 having only one image sensor 14, which is located on the front side of the vehicle 10.

The image sensor 14 senses an area associated with the vehicle 10 and generates sensor signals based thereon. In various embodiments, the sensor signals include image data. The image data, when arranged, illustrates a scene, for example, outside of the vehicle 10. The radar system 15 can be located anywhere inside or outside of the vehicle 10, including but not limited to a front side of the vehicle 10, a left side of the vehicle 10, a right side of the vehicle 10, and a back side of the vehicle 10. As can be appreciated, multiple radar sensors 15 can be implemented on the vehicle 10, one for each of or a combination of the front side of the vehicle 10, the left side of the vehicle 10, the right side of the vehicle 10, and the back side of the vehicle 10. For exemplary purposes, the disclosure will be discussed in the context of the vehicle 10 having only one radar system 15, which is located on the front side of the vehicle 10.

The radar system 15 generates wave signals along one or more paths and receives any wave signals that reflect from the path(s). The object detection module 16 receives the signals from the image sensor 14 and the radar system 15, and processes the signals in order to detect an object. The object detection module 16 detects the object based on an image processing methods and systems of the present disclosure. In general, the object detection module 16 processes the image data using deep learning models to determine stixels in a scene. The deep learning models can include, but are not limited to, neural networks such as convolutional networks, or other deep learning models such as deep belief networks. The deep learning models are pre-trained based on a plethora of sample image data.

In various embodiments, the object detection module 16 selectively generates signals based on the detection of the object. The signals are received by a control module 18 and/or an alert module 20 to selectively control the vehicle 10 and/or to alert the driver of the object and/or to control the vehicle 10.

Figure 2:
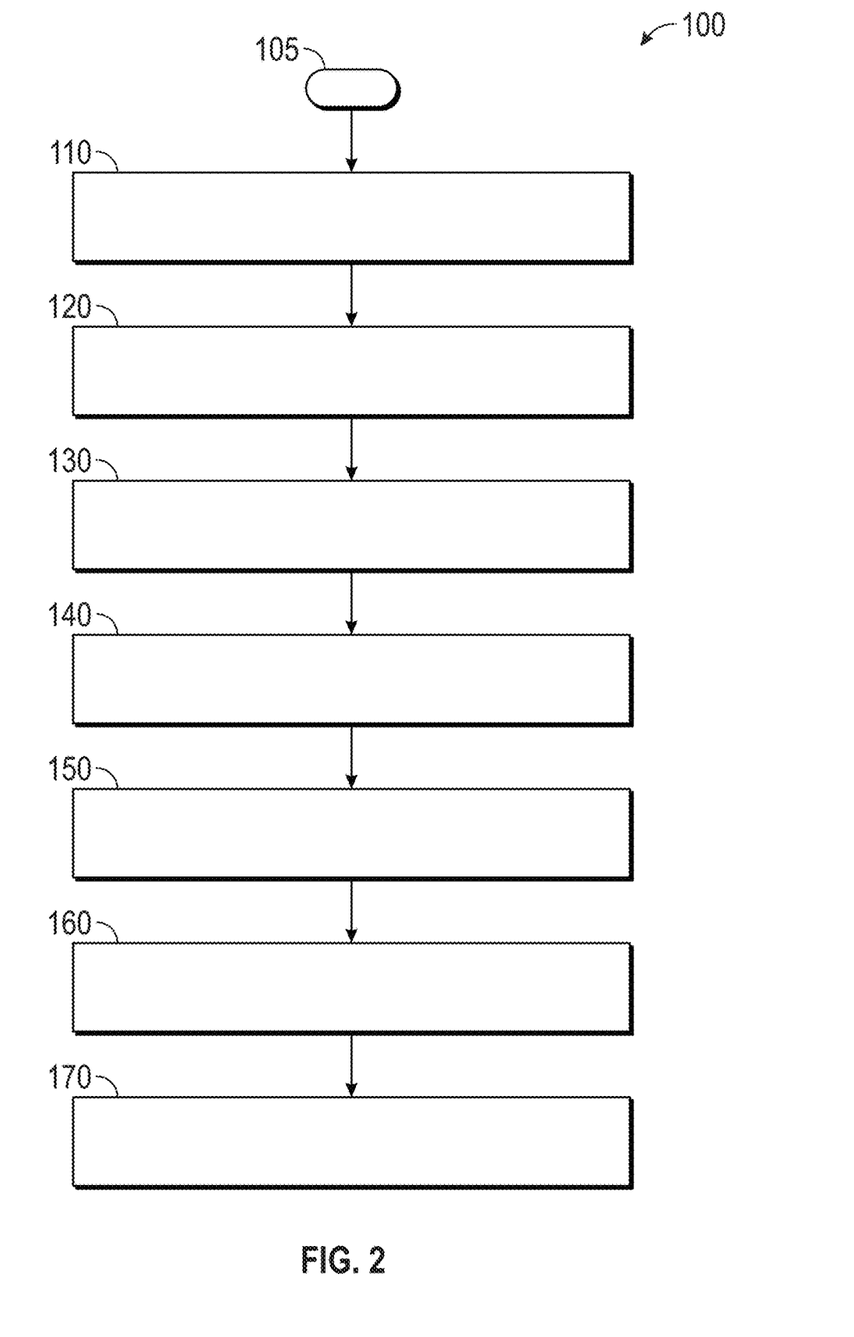
FIG. 2 is a flowchart illustrating an object detection method that may be performed by the object detection system in accordance with various embodiments.

Referring now to FIG. 2, and with continued reference to FIG. 1, a flowchart illustrates an object detection method 100 that may be performed by the object detection system 12 of FIG. 1 in accordance with various embodiments. As can be appreciated in light of the disclosure, the order of operation within the method 100 is not limited to the sequential execution as illustrated in FIG. 2, but may be performed in one or more varying orders as applicable and in accordance with the present disclosure.

As can further be appreciated, the method of FIG. 2 may be scheduled to run at predetermined time intervals during operation of the vehicle 10 and/or may be scheduled to run based on predetermined events.

Figure 3:
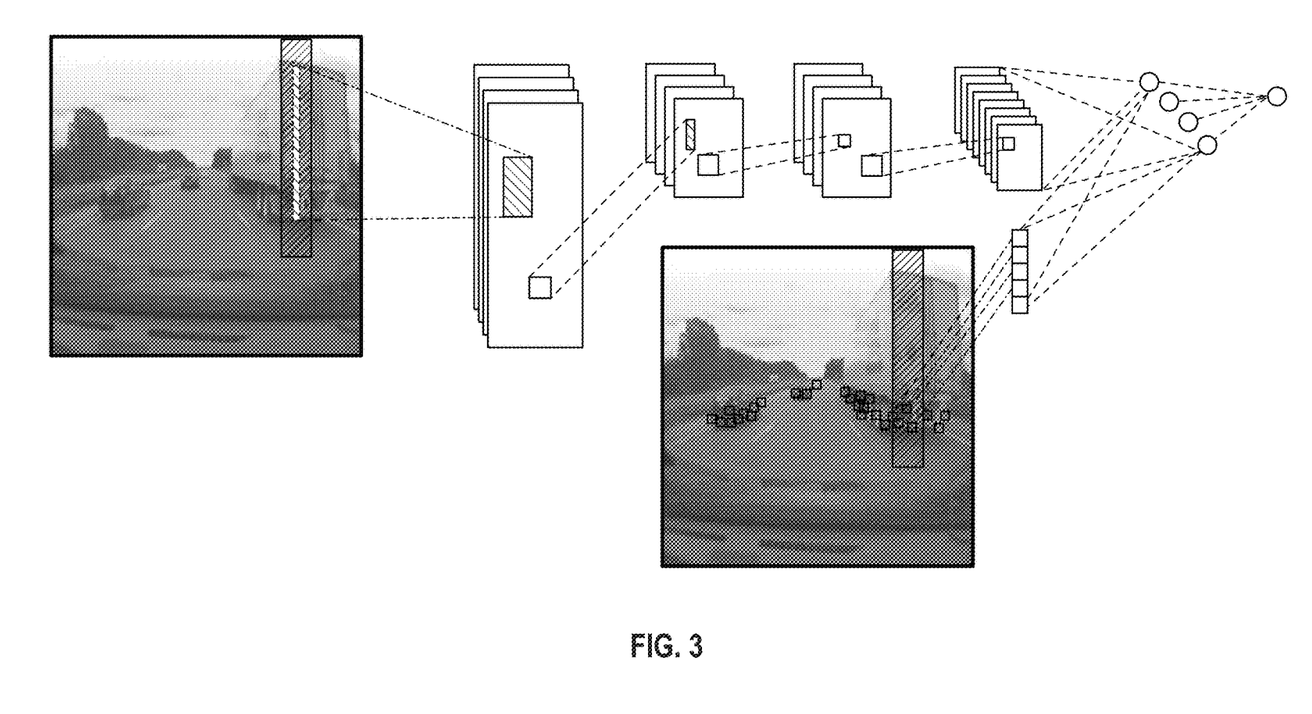
FIGS. 3-6 are illustrations of image scenes and processing methods in accordance with various embodiments.
Figure 4:
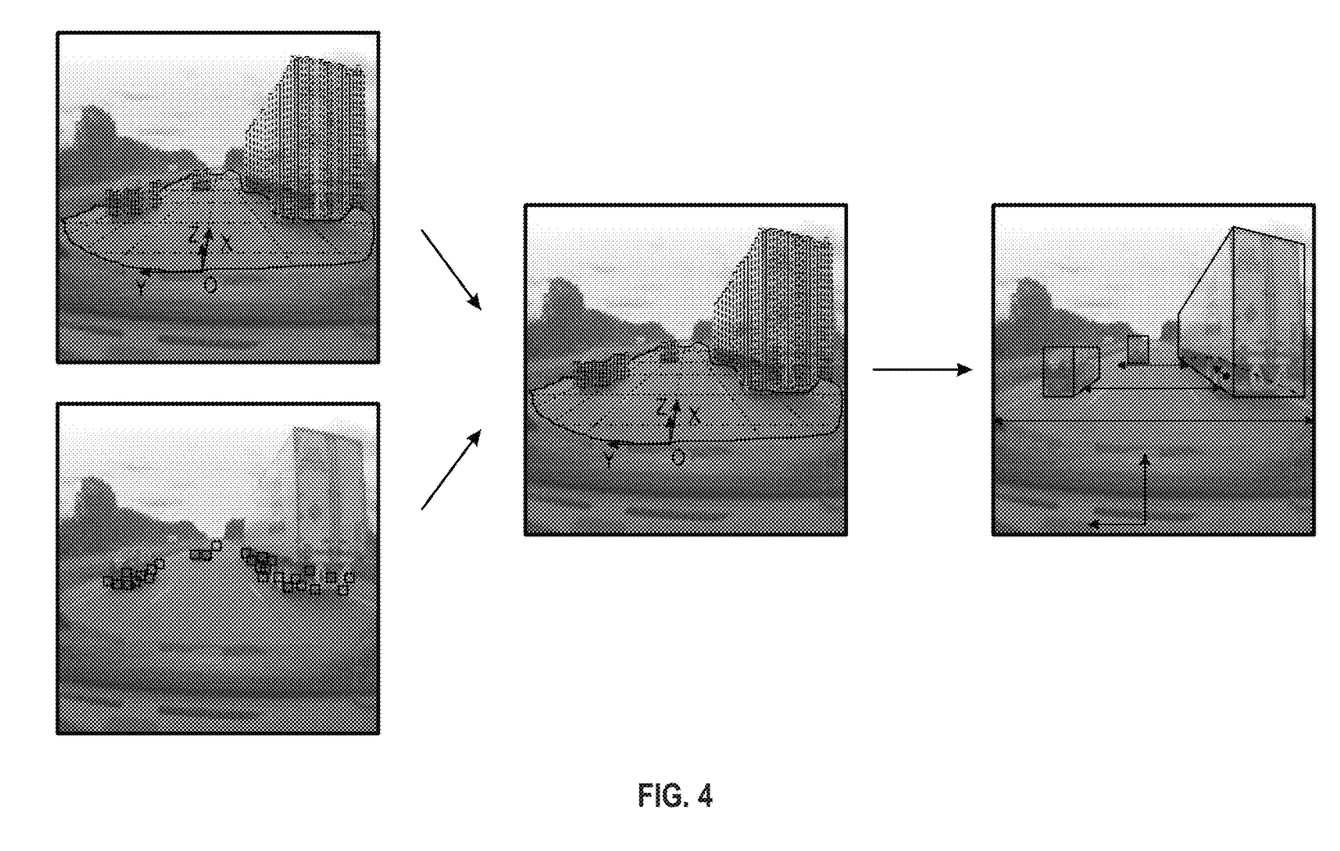

In one example, the method may begin at 105. The image data from the image sensor 14 and the radar data from the radar system 15 are received at 110. The image data is processed at 120 to determine stixel data. For example, as shown in FIGS. 3 and 4 the image data is received and a scene is formed therefrom. A region of interest (ROI) window is formed (i.e., the shaded rectangle from the top row to the lowest row not occluded by vehicle body (shown in the FIG. 3)), as the input layer to convolution neural network (CNN). The CNN determines if the centerline of the ROI contains a stixel, and reports the probability, location (rV, rV), height h, and class label 1 to which the stixel belongs. The ROI window is moved from left to right of the image to sequentially determine a presence of stixels for each ROI window location.

The labeled data is used to train the stixel detector using CNN, which will automatically create a visual feature map.

With reference back to FIG. 2, at 130, the object detection module 16 processes the radar data to determine radar presence vectors. For example, as shown in FIGS. 3 and 4, all of the radar points are projected onto an image plane. The image plane is partitioned into ROIs and the ROIs are partitioned into vertical slices, with each vertical slice being a stixel candidate. The presence of a radar point is determined in the slices and the row index is assigned to the corresponding element in the presence vector. (Note that the default value for non-presence elements is zero.)

Figure 5:
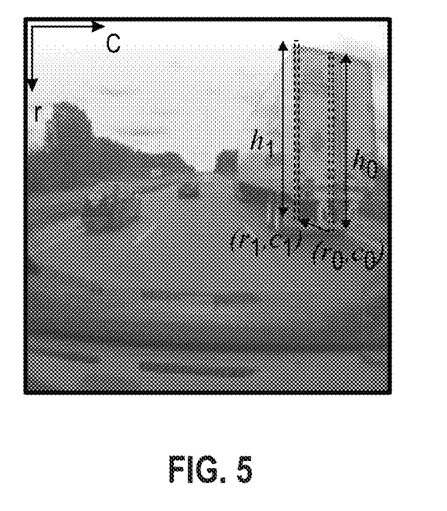

With reference back to FIG. 2, at 130, the object detection module 16 then fuses the radar points with the identified stixels in the scene. For example, as shown in FIGS. 3 and 4, the radar presence vector and the visual feature map are provided to the classic fully connected layers that finally output the presence probability for the stixel, and the stixel's location (rv), height (h), and matched radar point (d). As illustrated in FIG. 5, stixels are stored in a one dimensional array indexed by the column c. Given that the camera is calibrated, a point p=(x, y) in the xy-plane can be mapped to a point in the image plane q=(r, c) in unit of image pixels: q=H(p) and vice versa p=H$^{-1}$ (q). Each stixel has the following attributes:

Column (image): c
Row (image): r
Height (image): h
two dimensional position in xy-plane: p can be derived from q=(r, c) and radar two dimensional position $p_R$.

$$p = \frac{\mathcal{H}^{-1}(q)}{\sigma_V^2} + \frac{P_R}{\sigma_R^2}$$

where $\sigma_V$ is the position measurement accuracy using signals from stixel position, $\sigma_R$ is position measurement accuracy using signals from radar;

Radar Doppler measurement: d.

The subscripts 0 and 1 indicate the attributes from the same stixel estimated at time $t_0$ and $t_1$. The time interval $\Delta t = t_0 - t_1$.

Figure 6:
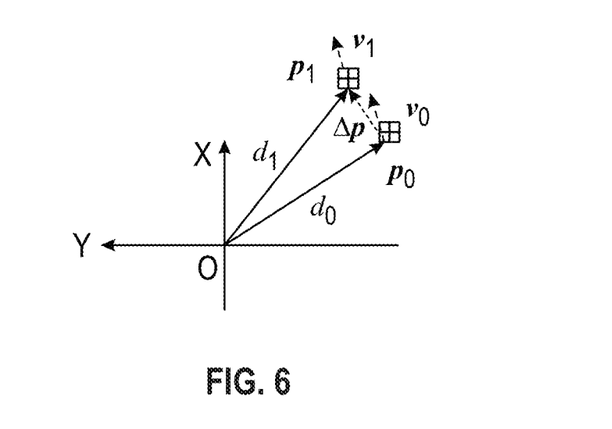

With reference back to FIG. 2, at 150, the object detection module then determines a 2 d velocity in xy-plane: v for each stixel. For example, as illustrated in FIGS. 5 and 6, without loss of generality, $c_1$, $c_0$ indicates the same stixel from an object at time $t_1$ and $t_0$, respectively. The stixel motion estimation is formulated as the assignment of motion m (in image columns) to stixel $c_1$, such that $c_1=c_0+m$. Given the stixel $c_1$ and the motion assignment m with respect to the stixel $c_0$ of the previous time frame, the two dimensional velocity ($v_1(c_1)$) for the stixel $c_1$ is the minimum of the quadratic expression:

$$\min L(c_1, m)$$

and $$L(c_1, m) = \frac{\left|\frac{v_1, p_1(c_1)}{\|p_1(c_1)\|} - d_1(c_1)\right|^2}{\sigma_D^2} + \frac{\|\mathcal{H}(v_1, p_1(c_1))\Delta t - \Delta q\|^2}{\sigma_V^2},$$

where the function $H(v_1, p_1(c_l))$ maps the two dimensional velocity at location $p_1(c_1)$ in the xy-plane to the image plane, and the optical flow vector:

$$\Delta q = \begin{pmatrix} r_1(c_1) - r_0(c_0) \\ m \end{pmatrix},$$

where $\sigma_D$ is the radar Doppler accuracy, and $\sigma_V$ is the optical flow accuracy for the stixel in units of pixel. Thus, the estimated two dimensional velocity is a function of the motion assignment m, written as $v_1(c_1, m)$.

With reference back to FIG. 2, at 160 and 170, the object detection module 16 then estimates the optimal column displacement in pixel $m^*(c_1)$ via a standard dynamic programming minimization and determines objects based on the estimated displacement. For example, let $C_1$ be the set of all columns that contain valid stixels on the input frame. The minimization problem is to solve:

$$m^*(c_1) = \underset{m(c_1)}{\arg\min} \sum_{c_1 \in C_1} [Cost(c_1, m(c_1)) + Temp(c_1, m(c_1))] +$$

$$\sum_{c_1 \in C_1} Reg(m(c_1), m(c_1+1))$$

The dynamic programming is performed in two phases. The dynamic programming matrix D is formed with the columns being all eligible locations of stixel (i.e., $C_1$) and rows being all eligible motion (i.e., $M(c_1)$ for $c_1 \in C_1$).

For simplicity of notation, the subscript in the current stixel $c_1$ is ignored for the following dynamic programming matrix D computation.

In the first pass, $D(c, m)$ is computed recursively (from right to left) as given below:

$$D(c, m) = \begin{cases} \text{Cost}(c, m) + \text{Temp}(c, m) & \text{if } c = c_{max} \\ \min_{e \in M(c+1)}(D(c+1, e) + \text{Reg}(m, e)) & \text{otherwise} \end{cases}$$

where $c_{max}$ is the right most stixel in $C_1$.

Otherwise for all $m \in M(c)$ and $c \in C_1$. For simplicity, note that c denotes the stixel at column c in time frame t1. The stixel motion estimations m(c) can be derived with backtracking in the second phase (from left to right):

$$m(c) = \begin{cases} \text{argmin}_m D(1, m) & \text{if } c = 1 \\ \text{argmin}_m [D(c, m) + \text{Reg}(m(c-1), m)] & \text{otherwise} \end{cases}$$

In various embodiments, the matching cost of a stixel $c_1$ and $c_0$ can be:

$$\text{Cost}(c_1, m) = \begin{cases} aSAD(c_1, m) + b|h_1(c_1) - h_0(c_0)| + \gamma|d_1(c_1) - d_0(c_0)|, & \text{if } m \in M(c_1) \\ c_{null}, & \text{otherwise} \end{cases}$$

where $h_i(c)$ is the height, in meters, of the stixel at column c on frame $t_1$; a, b, and γ are scaling parameters; $d_i(c)$ is the Doppler measurement, in the xy-plane, of the stixel at column c on frame $t_1$. The set $M(c_1)$ includes the all eligible column displacement of the stixel $c_1$ with respect to the previous time frame. It depends on the position of the stixel and the frame rate at which the images are captured. For example, for a close-by stixel its corresponding $|M(c_1)|$ tends to larger, and decreasing as it moving far away from the image sensor 14. The cost $c_{null}$ is for the default cost value for non-valid motions, set to the maximum possible cost value in the above equation. $SAD(c_1, m)$ is the pixel-wise sum of absolute differences over RGB color channels between the stixel $c_1$ at $t_1$ and the stixel $c_0 = c_1 - m$ at $t_0$.

In various embodiments, neighboring stixels can either correspond to the same object or to separate objects. If the stixels correspond to the same object, they should have similar motion:

$$\text{Reg}(m(c1), m(c1+1)) = ks|m(c1) - m(c1+1)|.$$

The scaling factor ks depends on the likeliness of the neighboring stixels (i.e., $c_1$ and $c_1+1$) that belong to the same object. ks shall be large if stixels $c_1$ and $c_1+1$ belong to the same object and, meanwhile, ks shall be small if they belong to different objects.

In various embodiments, objects in a scene can have different orientations with respect to the camera. Depending on the object orientation, different parts of the same object might have different depth values. But, there is a spatial continuity in depth in small neighborhoods of the object. Therefore, it can be assumed that neighbor stixels within a small neighborhood have similar depth values.

Stixels in a small neighborhood that have similar depth values may still belong to different objects (e.g., pedestrian vs. vehicle in a scene where a pedestrian stands closely by a parked vehicle). For this case, the semantic labels (e.g., pedestrian, vehicle, etc.) are informative cues for separating stixels with respect to different objects.

For automotive application scenes, radar Doppler measurements are another weak cue to segment stixels into objects.

Therefore, a design of the scaling factor can be:

$$k_s = \beta_x + \beta_l + \beta_d$$

where $$\beta_x = k_x \max\left(\alpha_x, 1 - \frac{|x_1(c_1) - x_1(c_1+1)|}{\Delta x}\right) \quad \text{[depth cue]}$$

$$\beta_l = k_l \cdot eq(l_1, (c_1), l_1(c_1+1)) \quad \text{[semantic label cue]}$$

$$\beta_d = k_d \max\left(\alpha_d, 1 - \frac{|d_1(c_1) - d_1(c_1+1)|}{\Delta d}\right) \quad \text{[Doppler cue]}$$

and $x_1(c_1)$ denotes the x-coordinate of the stixel $c_1$ in the xy-plane, the function $$eq(x, y) = \begin{cases} 1 & x = y \\ 0 & \text{otherwise} \end{cases},$$

Δx and Δd are maximal possible differences for depth and Doppler for neighboring stixels corresponding to the same objects.

In one embodiment, provided $\alpha x = 0.1$, $\alpha_l = 0.5$, $\alpha_d = 0.2$, $\Delta x = 3$, $\Delta d = 2$, and $k_x$, $k_l$, and $k_d$ are normalized similarly as the scaling parameters a, b, and γ in the matching cost function.

In various embodiments, the motion of stixels is smooth for automotive scenes. Therefore, besides the spatial constraint the following temporal constraint can be added for stixel $c_1$ to ensure the smoothness of motion:

$$\text{Temp}(c_1, m) = k_t |v_1(c_1, m) - v_0(c_0)|$$

where $v_1(c_1, m)$ is the two dimensional velocity estimation given assumption of the motion assignment m to the stixel, and kt is the weight scaling factor.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for detecting an object, comprising:
   receiving, by a processor, image data from an image sensor;
   receiving, by the processor, radar data from a radar system;
   processing, by the processor, the image data from the image sensor to determine one or more stixels;
   processing, by the processor, the radar data from the radar system to determine one or more presence vectors;
   fusing, by the processor, the one or more stixels and the one or more presence vectors using a deep learning method;

estimating, by the processor, a motion of the one or more stixels based on the fused stixels and presence vectors; and detecting, by the processor, an object based on the estimated motion of the one or more stixels.

2. The method of claim 1, wherein the processing comprises:

forming a region of interest (ROI) window of an image based on the image data; and moving the ROI window to a plurality of locations, from a left side of the image location to a right side of the image, to sequentially determine a presence of a stixel at each location.

3. The method of claim 1, wherein the processing comprises:

forming a region of interest (ROI) window based on the image data;

determining whether a centerline of the ROI window includes a stixel using a convolution neural network; and reporting a probability, a location, a height, and a class label when a stixel is determined.

4. The method of claim 1, further comprising determining a velocity for each of the fused stixels and presence vectors, and wherein the detecting the object is based on the velocity of each of the fused stixels and presence vectors.

5. The method of claim 4, further comprising determining a displacement for each of the fused stixels and presence vectors, and wherein the detecting the object is based on the displacement of each of the fused stixels and presence vectors.

6. A system for detecting an object, comprising:

an image sensor that generates image data;

a radar system that generates radar data; and a computer module that, by a processor, processes the image data from the image sensor to determine one or more stixels, processes, the radar data from the radar system to determine one or more presence vectors, fuses the one or more stixels and the one or more presence vectors, estimates, a motion of the one or more stixels based on the fused stixels and presence vectors; and and detects an object based on the estimated motion of the one or more stixels.

7. The system of claim 6, wherein the computer module forms a region of interest (ROI) window of an image based on the image data; and moves the ROI window to a plurality of locations, from a left side of the image location to a right side of the image, to sequentially determine a presence of a stixel at each location.

8. The system of claim 6, wherein the computer module forms a region of interest (ROI) window based on the image data, determines whether a centerline of the ROI window includes a stixel using a convolution neural network, and reports a probability, a location, a height, and a class label when a stixel is determined.

9. The system of claim 6, wherein the computer module determines a velocity for each of the fused stixels and presence vectors, and detects the object based on the velocity of each of the fused stixels and presence vectors.

10. The system of claim 9, wherein the computer module determines a displacement for each of the fused stixels and presence vectors, and detects the object based on the displacement of each of the fused stixels and presence vectors.

11. The system of claim 6, wherein the image sensor and the radar system are associated with a vehicle, and wherein the control module detects the object in proximity to the vehicle.

12. The method of claim 1, wherein the estimating the motion is based on an optimal column displacement in pixel using a standard dynamic programming minimization method.

13. The method of claim 12, wherein the standard dynamic programming minimization method is a two-phase method with columns including locations of valid stixels of the one or more stixels and rows including motion.

* * * * *